Patented July 5, 1938

2,122,788

UNITED STATES PATENT OFFICE 2,122,788

DEHYDROGENATION OF GASEOUS PARAFFINS

Hans Tropsch, Chicago, Ill., assignor to Universal Oil Products Company, Chicago, Ill., a corporation of Delaware No Drawing. Application July 12, 1935, Serial No. 31,103

11 Claims. (Cl. 260—170)

This invention relates to the treatment of paraffin hydrocarbons which are normally gaseous including ethane, propane and the butanes.

In a more specific sense the invention is concerned with a process for converting these low boiling members of the paraffin series of hydrocarbons into their corresponding olefins which contain two atoms of hydrogen less per molecule and consequently have one double bond between carbon atoms.

There is a large commercial production of gaseous paraffin hydrocarbons. They occur in very large quantities in natural gas, particularly those gases associated with the production of crude oil and commonly known as casing head gases and this supply is further augmented by the gases produced in cracking oils for the production of gasoline although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives on account of the unreactive character of its components in comparison with their olefinic counterparts.

In one specific embodiment the present invention comprises the dehydrogenation of gaseous paraffin hydrocarbons at elevated temperatures in the presence of catalysts comprising essentially aluminum oxide supporting minor amounts of chromates and/or dichromates of lead, zinc, magnesium, cadmium, iron, nickel, cobalt and alkali metals and other chromates, for instance thorium chromate, along with still smaller proportions of selected sulfates, nitrates, acetates and other salts of these same metals.

In the present instance the catalyst mixtures which are preferred for selectively dehydrogenating the lower boiling paraffinic hydrocarbons have been evolved as the result of a large number of experiments with catalysts having a dehydrogenating action upon various types of hydrocarbons such as are encountered in the fractions produced in the distillation of petroleum and other naturally occurring hydrocarbon oil mixtures. The criterion of an acceptable dehydrogenating catalyst is that it shall split off hydrogen without inducing either carbon separation or scission of the bonds between carbon atoms. In the concept of the present invention, catalyst mixtures comprising major amounts of aluminum oxide and minor amounts of promoting salts, particularly of the heavy metals and the alkali metals, have been found to be particularly valuable and efficient, although some salts of the alkaline earth metals may also be used. While aluminum oxide alone is a fairly good dehydrogenating catalyst in the above sense, the tendency to selective splitting off of hydrogen on the one hand and to carbon deposition on the other hand has been found to be lessened by the use of the present types of activators so that the dehydrogenating action is rendered more definite and effective.

Aluminum oxide itself prepared by the controlled calcination of natural carbonate and hydrate ores, or by chemical precipitation methods is in itself a fairly good catalyst for accelerating the rate of dehydration of gaseous paraffins over a considerable temperature range. However, an extensive series of experiments has demonstrated that this catalytic property is greatly improved by the addition of promoting substances in minor amounts, usually of the order of less than 10% by weight of the oxide.

Aluminum oxide to be used as a base material for the manufacture of catalysts for the process may be obtained from natural oxide minerals or ores such as bauxite or carbonates such as dawsonite by proper calcination or it may be prepared by precipitation of aluminum hydrate from solutions of aluminum sulphate or different alums, the precipitate of aluminum hydroxide being dehydrated by heat, and usually it is desirable and advantageous to further treat it with air or other gases or by other means to activate it prior to use.

Two hydrated oxides of aluminum occur in nature, to wit: Bauxite having the formula $Al_2O_3.2H_2O$ and diaspore $Al_2O_3.H_2O$. In both of these oxides iron sesqui-oxide may partially replace the aluminum. These two minerals or corresponding oxides produced from precipitated and suitably activated aluminum hydrate are adaptable for the manufacture of the present type of catalysts and in some instances have given the best results of any of the compounds whose use is at present contemplated. The mineral dawsonite having the formula

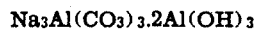

$$Na_3Al(CO_3)_3.2Al(OH)_3$$

is another mineral which may be used as a source of aluminum oxide.

A considerable number of alternative catalysts fall within the scope of the present invention. In any case each combination will exert its own particular influence upon the dehydrogenating reactions which will not be identical with that of other alternative materials of varying composition. Catalysts of the present character may be considered as aluminum oxide containing chromates as the essential promoting catalysts, the value of which are accentuated by further additions of other salts of the character indicated. Later examples will show the results obtained with different combinations of this general character. The alternative combinations mentioned exclude salts of the halogen acids which as a rule have not been found to produce good effects.

The preparation of active alumina as base material for the present type of composite catalysts involves generally the controlled calcination of aluminum hydrate obtained from various primary sources such as, for example, natural minerals or chemical precipitates. The conditions of time and temperature employed in calcining any particular mineral or precipitated material will depend, to a large extent, upon its physical and, to a smaller extent, upon its chemical composition. Aluminum ores may contain at times several percent of ferric oxide in isomorphous mixtures with aluminum oxide and since it may occur in nature in harder and more compact varieties than the precipitated materials, it may require different conditions of time and temperature to reduce substantially all of it to the desired oxide.

In making up catalyst composites of the preferred character and composition, the following is the simplest and generally the preferred procedure. Active aluminum oxide is ground and sized to produce granules of relatively small mesh and these are given the requisite amounts of promoter compounds by mixing them successively with aqueous solutions or suspensions of selected salts or salt mixtures. The aluminum oxide resulting from properly controlled calcination has a high absorptive capacity for dissolved activating materials and readily takes up the required percentages from aqueous solutions. To insure complete absorption of salts from the solutions and at the same time a uniform distribution upon the aluminum oxide granules, the latter may be added to relatively dilute solutions of salts and these may then be concentrated until a critical point is reached corresponding to complete removal of dissolved material. At this point the solvent may be removed by filtering or pressing or evaporation by heat.

In practicing the dehydrogenation of paraffinic gases according to the present process a solid composite catalyst prepared according to the foregoing alternative methods is used as a filler in a reaction tube or chamber in the form of particles of graded size or small pellets and the gas to be dehydrogenated is passed through the catalyst after being heated to the proper temperature, usually within the range of from 400 to 750° C. (752–1382° F.). The most commonly used temperatures are around 500° C. (932° F.). The catalyst tube may be heated exteriorly if desired to maintain the proper reaction temperature. The pressure employed may be atmospheric or slightly superatmospheric of the order of from 50 to 100 pounds per square inch, though any large amount of pressure has a tendency to depress the dehydrogenation reactions disproportionately to the increase in capacity of the plant. The time during which the gases are exposed to dehydrogenating conditions in the presence of the preferred catalyst is comparatively short, always below 20 seconds and frequently as low as from 4–8 seconds.

The exit gases from the tube or chamber may be passed through selective absorbents to combine with or absorb the olefin or olefin mixture produced or the olefins may be selectively polymerized by suitable catalysts, caused to alkylate other hydrocarbons such as aromatics or treated directly with chemical reagents to produce desirable and commercially valuable derivatives. After the olefins have been removed the residual gases may be recycled for further dehydrogenating treatment with or without removal of hydrogen.

Members of the present group of catalysts are particularly selective in removing two hydrogen atoms from a paraffin molecule to produce the corresponding olefin without furthering to any great degree undesirable side reactions, and because of this show an unusually long period of activity in service as will be shown in later examples. When, however, their activity begins to diminish it is readily regenerated by the simple expedient of oxidizing with air or other oxidizing gas at a moderately elevated temperature, usually within the range employed in the dehydrogenating reactions. This oxidation effectively removes traces of carbon deposits which contaminate the surface of the particle and decrease their efficiency. It is characteristic of the present types of catalysts that they may be repeatedly regenerated without loss of porosity or catalyzing efficiency.

Numerous experimental data could be adduced to indicate the results obtainable by employing the present type of catalyst to dehydrogenate paraffins, but the following examples are sufficiently characteristic.

*Example I*

The preparation of the catalyst was as follows: 50 parts by weight of aluminum oxide ground and screened to 8–10 mesh was treated with 100 parts of a 1% solution of chromic acid. The aluminum oxide impregnated with the chromic acid was then dried and thereafter treated with 100 parts of a solution containing 1% of cobaltous nitrate, 1% of lead acetate and 1% of zinc acetate at 25° C. (77° F.) for one half hour. The impregnated catalyst was then dried without further washing. Isobutane was passed through a treating tower containing the granules of catalyst as filler at atmospheric pressure and temperatures of about 600° C., (1112° F.) with a space velocity of from 50 to 70 per hour.

The following table shows the nature of the results obtained by means of gas analyses taken at indicated times from the start of the run.

*Composition of dehydrogenated gases*

| Time after start, hours | 40 | 80 | 150 | 250 |
|---|---|---|---|---|
| i-Butylene, percent | 24.8 | 23.7 | 24.8 | 24.8 |
| Other butylenes and propylene, percent | 6.1 | 5.0 | 5.2 | 5.7 |
| Ethylene, percent | 2.0 | 2.1 | 4.4 | 2.0 |
| Paraffins (mainly i-butane), percent | 35.2 | 37.3 | 35.6 | 38.5 |
| Hydrogen, percent | 31.9 | 31.9 | 30.0 | 29.0 |

From the above data it will be seen that the dehydrogenation corresponds closely to the calculated equilibrium mixture at 600° C., (1112° F.) which should contain approximately 33% hydrogen, 33% butane and 33% butylenes. Substantially 50% of the original isobutane was converted into olefins and hydrogen.

It is to be further observed that the catalytic activity was maintained substantially constant for the period of a run of approximately 10 days.

*Example II*

The catalyst used in this case consisted of granulated aluminum oxide supporting lead chromate and ferric sulfate. To make the catalyst, 75 parts by weight of a previously prepared material containing lead chromate was added to 150 parts of a 1% ferric sulfate solution, in which it was stirred for about ½ hour at 50° C. The catalyst particles were then filtered from the solution and dried at 300° C. (572° F.).

Using small pellets of the above oxide mixture n-butane was passed through a treating tower containing the pellets as filler at atmospheric pressure and temperatures of about 600° C., (1112° F.) with a space velocity of from 45 to 55 per hour.

The following table shows the nature of the results obtained by means of gas analyses taken at indicated times from the start of the run.

*Composition of dehydrogenated gases*

| Time after start, hours | 40 | 60 | 80 | 120 |
|---|---|---|---|---|
| n-Butane, percent | 18.4 | 18.1 | 17.3 | 16.0 |
| Propylene, percent | 12.5 | 11.6 | 9.9 | 9.3 |
| Ethylene, percent | 2.3 | 2.4 | 4.8 | 2.2 |
| Paraffins, percent | 41.2 | 42.9 | 43.9 | 50.3 |
| Hydrogen, percent | 25.6 | 25.2 | 24.1 | 22.2 |

It is again observable that the catalytic activity was maintained substantially constant for a period of a run which was in this case 5 days.

*Example III*

A catalyst was prepared which contained magnesium chromate and zinc sulfate supported on aluminum oxide by the following method. 45 parts by weight of aluminum nitrate, an equal weight of magnesium chromate and 10 parts by weight of zinc sulfate were separately dissolved in small amounts of water, the solutions mixed and the composite evapprated to dryness. The dry powder was heated at 250° C. (482° F.) for several hours and finally at 500° C. (932° F.) for one hour. The material was then ground and sized to conserve particles of from 6–10 mesh diameter.

Using small pellets of the above oxide mixture made by moistening and compressing and later drying as in the previous examples, propane was passed through a treating tower containing the pellets as filler at atmospheric pressure and temperatures of about 600° C., (1112° F.) with a space velocity of from 40 to 45 per hour.

The following table shows the nature of the results obtained by means of gas analyses taken at the same indicated times from the start of the run.

*Composition of dehydrogenated gases*

| Time after start, hours | 40 | 60 | 80 | 120 |
|---|---|---|---|---|
| Propane, percent | 15.0 | 14.6 | 14.2 | 13.7 |
| Ethylene, percent | 3.2 | 3.5 | 5.4 | 3.3 |
| Paraffins (mainly propane), percent | 64.4 | 64.7 | 63.7 | 67.3 |
| Hydrogen, percent | 17.4 | 17.2 | 16.7 | 15.7 |

There was substantially no change in the catalytic activity of the catalyst used over a period of 6 days of continuous operation.

The foregoing specification and examples are sufficient to show that the invention has intrinsic value when practiced in the art, but neither section is to be construed as imposing limitations upon the scope of the invention, as both are given for illustrative purposes only.

I claim as my invention:

1. A process for the dehydrogenation of normally gaseous paraffin hydrocarbons to produce olefin hydrocarbons which comprises subjecting said paraffin hydrocarbons under dehydrogenating conditions to the action of a catalyst comprising essentially aluminum oxide supporting a promoter catalyst comprising essentially a chromate and a salt of an acid selected from the group consisting of sulfuric, nitric and acetic acids.

2. A process for the dehydrogenation of normally gaseous paraffin hydrocarbons to produce olefin hydrocarbons which comprises subjecting said paraffin hydrocarbons under dehydrogenating conditions to the action of a catalyst comprising essentially aluminum oxide supporting as promoter catalysts a chromate selected from the group consisting of the chromates of lead, zinc, magnesium, cadmium, iron, nickel and cobalt, and a salt of an acid selected from the group consisting of sulphuric, nitric and acetic acids.

3. A process for the dehydrogenation of normally gaseous paraffin hydrocarbons to produce olefin hydrocarbons which comprises subjecting said paraffin hydrocarbons under dehydrogenating conditions to the action of a catalyst comprising essentially aluminum oxide supporting as promoter catalysts a chromate selected from the group consisting of the chromates of lead, zinc, magnesium, cadmium, iron, nickel and cobalt and a salt formed by the combination of these same metals with an acid selected from the group consisting of sulphuric, nitric and acetic acids.

4. A process for the dehydrogenation of normally gaseous paraffin hydrocarbons to produce olefin hydrocarbons which comprises subjecting said paraffin hydrocarbons under dehydrogenating conditions to the action of a catalyst comprising essentially aluminum oxide supporting as promoter catalysts a chromate of an alkali metal and a salt of an alkali metal with an acid selected from the group consisting of sulphuric, nitric and acetic acids.

5. A process for the dehydrogenation of normally gaseous paraffin hydrocarbons to produce olefin hydrocarbons which comprises subjecting said paraffin hydrocarbons to the action of a catalyst comprising essentially aluminum oxide supporting promoter catalyst comprising essentially a chromate and a salt of an acid selected from the group consisting of sulfuric, nitric and acetic acids, at a temperature of from 750 to 1380° F. and for a time period of from 4 to 20 seconds.

6. A process for the dehydrogenation of normally gaseous paraffin hydrocarbons to produce olefin hydrocarbons which comprises subjecting said paraffin hydrocarbons to the action of a catalyst comprising essentially aluminum oxide supporting as promoter catalysts a chromate selected from the group consisting of the chromates of lead, zinc, magnesium, cadmium, iron, nickel and cobalt, and a salt of an acid selected from the group consisting of sulphuric, nitric and acetic acids, at a temperature of from 750 to 1380° F. and for a time period of from 4 to 20 seconds.

7. A process for the dehydrogenation of normally gaseous paraffin hydrocarbons to produce olefin hydrocarbons which comprises subjecting said paraffin hydrocarbons to the action of a catalyst comprising essentially aluminum oxide supporting as promoter catalysts a chromate selected from the group consisting of the chromates of lead, zinc, magnesium, cadmium, iron, nickel and cobalt and a salt formed by the combination of these same metals with an acid selected from the group consisting of sulphuric, nitric and acetic acids, at a temperature of from 750 to 1380° F. and for a time period of from 4 to 20 seconds.

8. A process for the dehydrogenation of normally gaseous paraffin hydrocarbons to produce olefin hydrocarbons which comprises subjecting said paraffin hydrocarbons to the action of a catalyst comprising essentially aluminum oxide supporting a promoter catalyst comprising essentially aluminum oxide supporting as promoter catalysts a chromate of an alkali metal and a salt of an alkali metal with an acid selected from the group consisting of sulphuric, nitric and acetic acids, at a temperature of from 750 to 1380° F. and for a time period of from 4 to 20 seconds.

9. A process for producing olefins from paraffin hydrocarbons which comprises subjecting the paraffins under dehydrogenating conditions to the action of an aluminum oxide catalyst containing minor proportions of a chromate and a salt of an acid selected from the group consisting of sulfuric, nitric and acetic acids.

10. A process for producing olefins from normally gaseous paraffin hydrocarbons which comprises subjecting the paraffins under dehydrogenating conditions to the action of an aluminum oxide catalyst containing minor proportions of a chromate and a salt of an acid selected from the group consisting of sulfuric, nitric and acetic acids.

11. A catalyst suitable for use in the dehydrogenation of hydrocarbons comprising a mixture of a major proportion of aluminum oxide and minor proportions of a chromate and a salt of an acid selected from the group consisting of sulfuric, nitric and acetic acids.

HANS TROPSCH.